United States Patent
Alfredsson et al.

(10) Patent No.: US 9,690,285 B2
(45) Date of Patent: Jun. 27, 2017

(54) PRESENTING FIELD USERS ON PROCESS GRAPHICS

(71) Applicant: ABB Technology Ltd, Zürich (CH)

(72) Inventors: Fredrik Alfredsson, Västerås (SE); Jonas Brönmark, Västerås (SE); Magnus Larsson, Västerås (SE); Elina Vartiainen, Västerås (SE)

(73) Assignee: ABB SCHWEIZ AG, Baden (CH)

( * ) Notice: Subject to any disclaimer, the term of this patent is extended or adjusted under 35 U.S.C. 154(b) by 246 days.

(21) Appl. No.: 14/759,633

(22) PCT Filed: Feb. 27, 2013

(86) PCT No.: PCT/EP2013/053870
§ 371 (c)(1),
(2) Date: Jul. 7, 2015

(87) PCT Pub. No.: WO2014/131437
PCT Pub. Date: Sep. 4, 2014

(65) Prior Publication Data
US 2015/0355629 A1    Dec. 10, 2015

(51) Int. Cl.
*G05B 19/406* (2006.01)
*H04W 4/00* (2009.01)
*G06Q 10/06* (2012.01)

(52) U.S. Cl.
CPC ....... *G05B 19/406* (2013.01); *G06Q 10/0631* (2013.01); *H04W 4/008* (2013.01); *G05B 2219/31197* (2013.01)

(58) Field of Classification Search
None
See application file for complete search history.

(56) References Cited

U.S. PATENT DOCUMENTS

| | | | |
|---|---|---|---|
| 6,339,709 | B1 | 1/2002 | Gladwin et al. |
| 6,433,687 | B1 | 8/2002 | Yamaashi et al. |
| 7,251,535 | B2 | 7/2007 | Farchmin et al. |
| 7,890,235 | B2 | 2/2011 | Self et al. |
| 8,332,063 | B2 | 12/2012 | Moshier |

(Continued)

FOREIGN PATENT DOCUMENTS

| | | |
|---|---|---|
| EP | 2 077 473 A1 | 7/2009 |
| GB | 2459880 A | 11/2009 |

(Continued)

*Primary Examiner* — Ryan Jarrett
(74) *Attorney, Agent, or Firm* — Birch, Stewart, Kolasch & Birch, LLP

(57) ABSTRACT

A method, field user presenting arrangement and a computer program product for enabling an operator of a process control system to determine the location of field users in the process control system are provided. The arrangement includes a presentation control unit that obtains position data of the position of a field user, obtain the positions of objects in the process control system, compares the position of the field user with the positions of the objects, determines that the field user is in the vicinity of an object if the distance between the position of the field user and the position of the object is below a proximity threshold, and presents the field user on graphics depicting the process, where a field user deemed to be in the vicinity of an object is presented at this object in the graphics.

20 Claims, 5 Drawing Sheets

(56) References Cited

U.S. PATENT DOCUMENTS

| | | |
|---|---|---|
| 2005/0015180 A1 | 1/2005 | Steger |
| 2009/0065578 A1 | 3/2009 | Peterson et al. |
| 2011/0254663 A1 | 10/2011 | Sakamoto et al. |
| 2014/0035726 A1* | 2/2014 | Schoner ............ G06K 7/10366 340/8.1 |

FOREIGN PATENT DOCUMENTS

| | | |
|---|---|---|
| JP | 2001-125633 A | 5/2001 |
| JP | 2002-73749 A | 3/2002 |
| JP | 2003-140728 A | 5/2003 |
| JP | 2004-157863 A | 6/2004 |
| JP | 2009-3872 A | 1/2009 |
| JP | 2009-157517 A | 7/2009 |
| JP | 2010-108149 A | 5/2010 |

* cited by examiner

PRESENTING FIELD USERS ON PROCESS GRAPHICS

FIELD OF THE INVENTION

The present invention generally relates to process control systems. More particularly the present invention relates to a method, field user presenting arrangement and a computer program product for enabling for enabling an operator of a process control system to determine the location of field users in the process control system.

BACKGROUND

A process control system normally comprises a number of process control objects involved in the control of the process.

In process control systems there are furthermore maintenance engineers that are most of the time working on the process floor close to these process control objects, which is typically far away from control rooms with work stations and other computers from which the system is monitored. The maintenance engineers make sure the process runs as smooth as possible by both preventive and direct maintenance.

Plant maintenance engineers thus work to ensure that the process is running as uninterrupted and smooth as possible. However, the operators in the control room may need to know the whereabouts of the maintenance engineers.

Operators working in the control rooms may thus want to know the current location of the maintenance engineer and the status of what the maintenance engineers are working with.

However, they have to combine this with monitoring of the status of the process. They may thus at the same time need to look at the status of the process, such as the occurrence of possible alarms, which may be difficult.

It is known to display the current location of workers on maps, see for instance JP 2003-140728 and U.S. Pat. No. 8,332,063. However, this does not help the operators if simultaneously trying to monitor the status of the process.

There is therefore a need for improvement in this field.

The present invention addresses one or more of the above-mentioned problems.

SUMMARY OF THE INVENTION

The present invention addresses the problem of simplifying for an operator to overview activities in a process control system.

This object is according to a first aspect of the invention achieved through a method of enabling an operator of a process control system to determine the location of field users in the process control system, the method being performed by a field user presenting arrangement and comprising:
obtaining position data of the position of a field user,
obtaining the positions of objects in the process control system,
comparing the position of the field user with the positions of the objects
determining that the field user is in the vicinity of an object if the distance between the position of the field user and the position of the object is below a proximity threshold, and
presenting the field user on graphics depicting the process, where a field user deemed to be in the vicinity of an object is presented at this object in the graphics.

This object is according to a second aspect of the invention achieved through a field user presenting arrangement for enabling an operator of a process control system to determine the location of field users in the process control system, the field user presenting arrangement comprising:
a presentation control unit configured to
obtain position data of the position of a field user
obtain the positions of objects in the process control system,
compare the position of the field user with the positions of the objects,
determine that the field user is in the vicinity of an object if the distance between the position of the field user and the position of the object is below a proximity threshold, and
present the field user on graphics depicting the process, where an field user deemed to be in the vicinity of an object is presented at this object in the graphics.

This object is according to a third aspect of the invention solved through a computer program product for enabling an operator of a process control system to determine the location of field users in the process control system, said computer program product being provided on a data carrier comprising computer program code configured to cause a field user presenting arrangement to, when said computer program code is loaded into the field user presenting arrangement,
obtain position data of the position of a field user,
obtain the positions of objects in the process control system,
compare the position of the field user with the positions of the objects,
determine that the field user is in the vicinity of an object if the distance between the position of the field user and the position of the object is below a proximity threshold, and
present the field user on graphics depicting the process, where a field user deemed to be in the vicinity of an object is presented at this object in the graphics.

The present invention has a number of advantages. The location of field users is integrated into the process control system. It is automatically displayed in the process graphics. This gives the operators a good overview of the plant and its current status. The control room operator is provided with the ability to monitor the location of maintenance engineers and monitor the performance of the process without having to switch between different screens, which thus improves the safety in the system and simplifies the work of the operator. This will also improve safety. The operators will further know more quickly who is available for task assignments, which also improves efficiency.

BRIEF DESCRIPTION OF THE DRAWINGS

The present invention will in the following be described with reference being made to the accompanying drawings, where FIG. 1 schematically shows an industrial plant with a process control system operating an industrial process together with a wireless terminal associated with a maintenance engineer, FIG. 2 schematically shows a block schematic of an operator terminal of the process control system.

DETAILED DESCRIPTION OF THE INVENTION

In the following, a detailed description of preferred embodiments of a method, field user presenting arrangement and a computer program product for enabling an operator of a process control system to determine the location of field users will be given.

Figure 1:
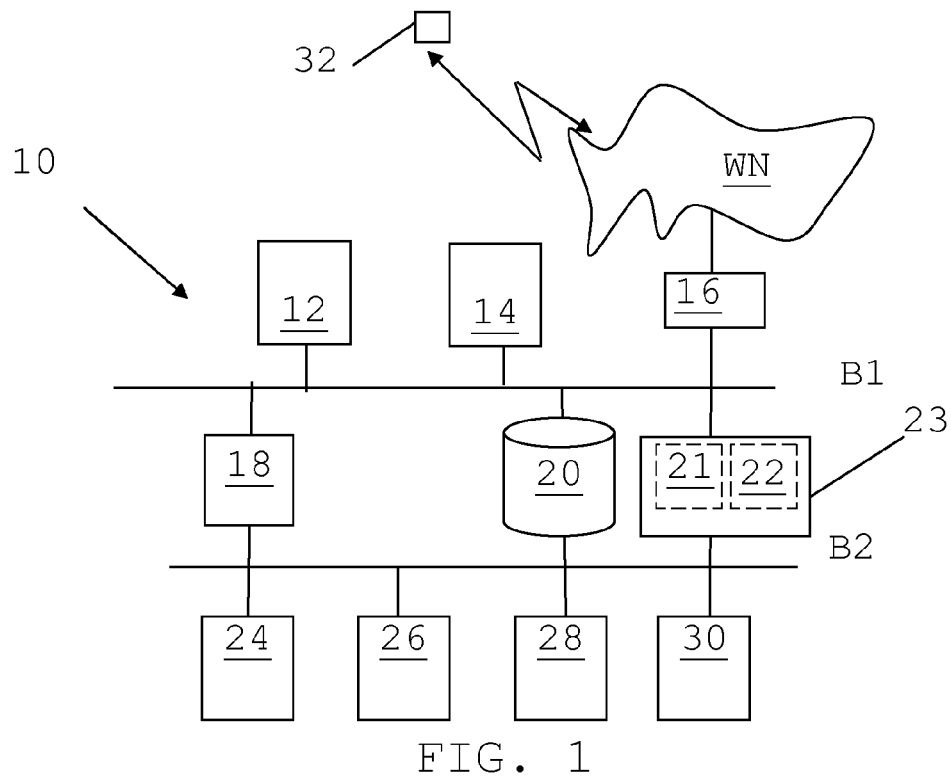

FIG. 1 schematically shows a process control system 10. The process control system 10 is a computerized process control system for controlling an industrial process. The process can be any type of industrial process, such as electrical power generation, transmission and distribution processes as well as water purification and distribution processes, oil and gas production and distribution processes, petrochemical, chemical, pharmaceutical and food processes, and pulp and paper production processes. These are just some examples of processes where the system can be applied. There exist countless other industrial processes. The processes may also be other types of industrial processes such as the manufacturing of goods. A process may be monitored through one or more process monitoring computers, which communicate with a server handling monitoring and control of the process.

In FIG. 1 the process control system 10 therefore includes a number of process monitoring computers 12 and 14. These computers may here also be considered to form operator terminals and are connected to a first data bus B1. There is thus a first and a second operator terminal 12 and 14. There is also a gateway 16 connected to this first data bus B1, which gateway 16 is connected to at least one wireless network WN. To the wireless network WN there is connected a first wireless terminal 32. It should be realized that it is possible with more wireless terminals in the wireless network WN. However, only one is shown for simplifying the understanding of the present invention. The wireless network WN may be a local network, such as a wireless local area network (WLAN). It may also be a Bluetooth network, i.e. a network with a number of interconnected Bluetooth nodes.

There is furthermore a second data bus B2 and between the first and second data busses B1 and B2 there is connected a server 18 providing control and protection of the process and a database 20 where data relating to control and protection of the process is stored. Such data relating to control and protection may here comprise process data such as measurements and control commands, while data relating to protection may comprise alarm and event data as well as data on which alarms and events can be generated, such as measurements made in the process. The database 20 may furthermore comprise historical data of the activities of field users, such as maintenance engineers. Such historical data may for instance comprise data about objects, such as process control objects having been serviced by maintenance engineers. For this reason the database 20 is in the following also referred to as a history database. There is furthermore a field user presenting server 23 connected between the two buses B1 and B2. The field user presenting server 23 comprises a presentation control block 21 and an object release determining block 22.

To the second data bus B2 there is furthermore connected a number of further devices 24, 26, 28 and 30. These further devices 24, 26, 28 and 30 are field devices, which are devices that are interfaces to the process being controlled. A field device is typically an interface via which measurements of the process are being made and to which control commands are given. Because of this the field devices are furthermore process control objects. In one variation of the invention a first field device is a first process control object 24, as an example a motor, and the second field device is a second process control object 26, as an example a centrifuge.

Figure 2:
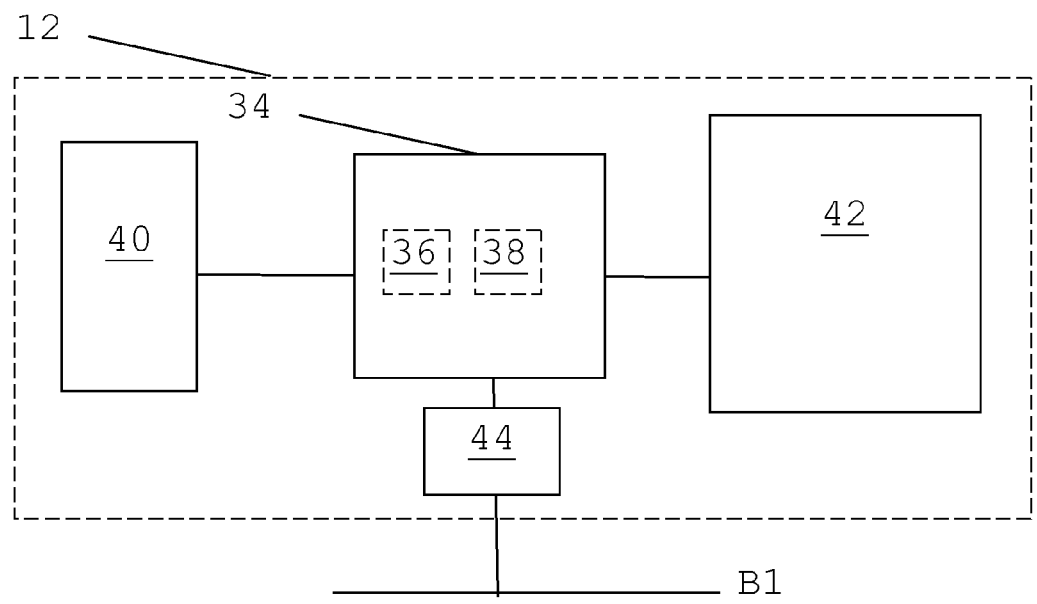

FIG. 2 schematically shows a block schematic of the first operator terminal 12. The first operator terminal 12 comprises a control unit 34 connected to a user input unit 40, perhaps in the form of a keyboard, keypad or trackball, to an information presenting unit 42, for instance in the form of a display 42, and to a communication interface 44 for connection to the first data bus B1. It is possible that the information presenting unit 42 and user input unit 40 are combined, for instance in the form of a touch screen. In the control unit 34 there is provided a presentation control element 36 and an object release determining element 38. The control unit 34 may be provided in the form of a processor with associated program memory comprising computer program code implementing the presentation element 36 and the object release determining element 38.

Figure 3:
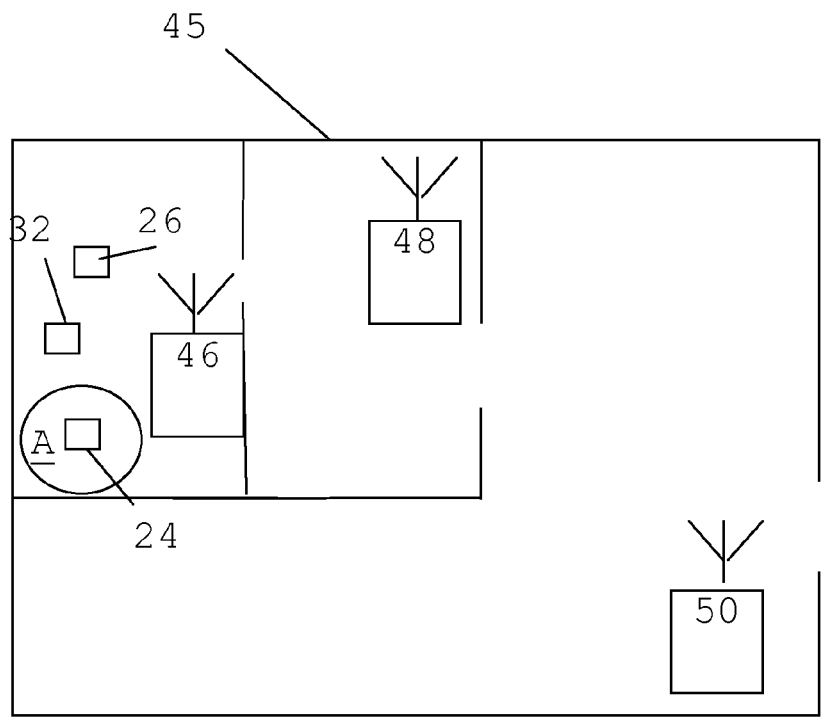
FIG. 3 shows premises of the industrial plant with a number of rooms, where a first wireless terminal of a first field user is in a first of the rooms comprising two process control objects, FIG. 4 schematically shows the first field user with the first wireless terminal in the first room in the proximity of a first of the two process control objects, FIG. 5 schematically shows a first view shown on the display of the operator terminal depicting process graphics together with an indication of the first field user, FIG. 6 schematically shows a second view shown on the display of the operator terminal depicting process graphics, an indication of the first field user as well as further information relating to the first field user.

FIG. 3 schematically shows a facility 45 of an industrial plant where at least a part of the process control system is provided. The facility 45 is here in the form of a building with a number of rooms. There is here a first room. In this first room the first and second process control objects 24 and 26 are located. In the first room there is a first wireless access point 46 of the wireless network. In this figure also the first wireless terminal 32 is located in the first room, which indicates that also a corresponding user is in this first room, which is a first field user. Next to the first room there is a second room with a second wireless access point 48. The second room in turn leads to a third larger room with a third wireless access point 50. In the third room there is a door leading out of the premises 45. The access points 46, 48, and 50 are here furthermore located close to doors leading to or from the rooms. The first wireless access point 46 is therefore provided close to a door interconnecting the first and the second rooms, the second wireless access point 48 is located close to a door interconnecting the second and the third rooms, while the third wireless access point 50 is provided close to a door leading out of the building 45. The above described access point positions close to doors are only exemplary. The invention is thus in no way limited to these positions. Others may be used.

The first room is here also shown as providing an area A, that surrounds the first process control object 24. The area A is here exemplified by a circular area, which thereby has a radius r.

Furthermore the positions of the wireless access points 46, 48 and 50 are typically known and because of this also the positions of wireless terminals and consequently their users may be known.

Figure 4:
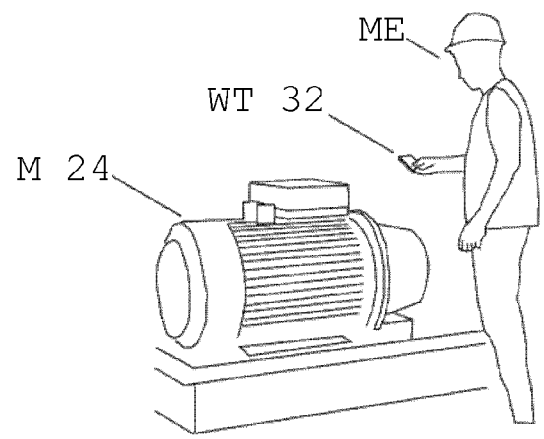
Figure 5:
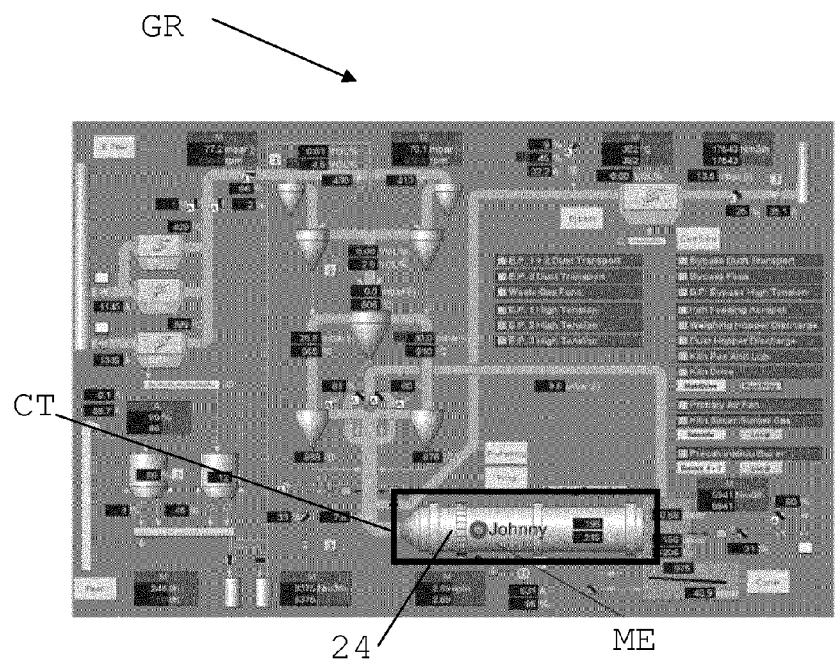
Figure 6:
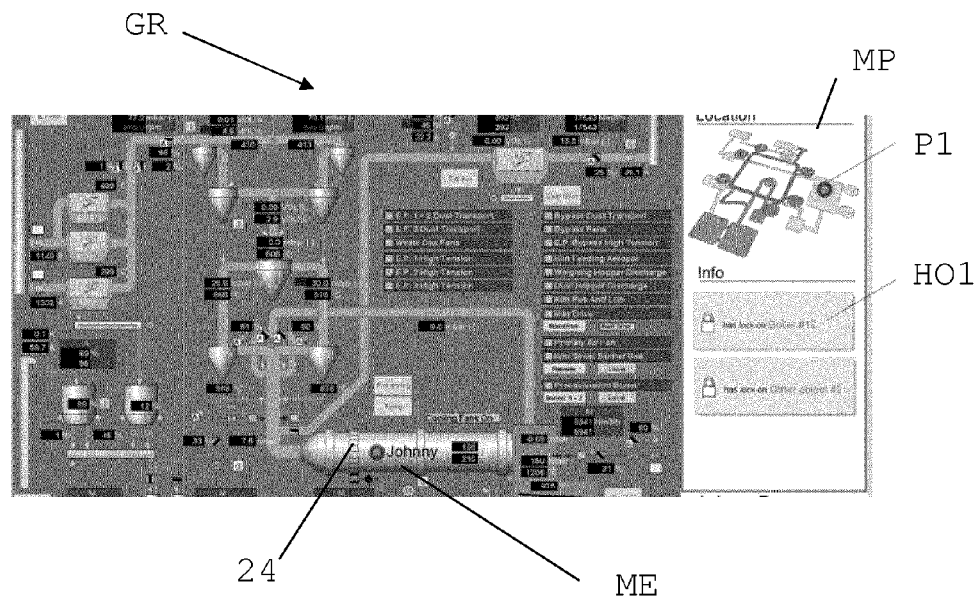
Figures 7, 8:
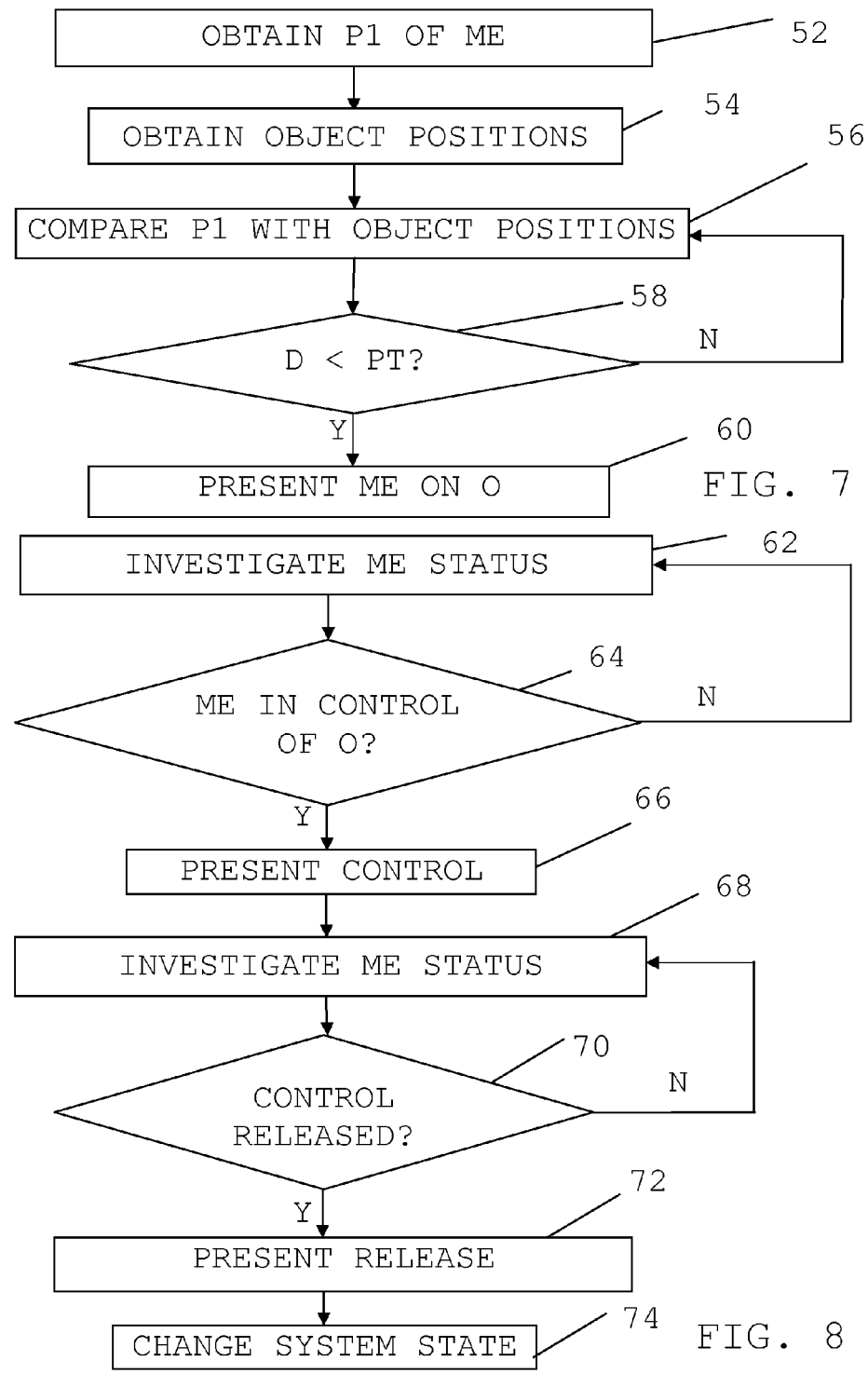
FIG. 7 shows a flow chart of a first group of method steps being performed in a method of enabling an operator of the process control system to determine the location of field users.
FIG. 8 shows a flow chart of a second group of method steps being performed in the method of enabling an operator of the process control system to determine the location of field users.
Figure 9:
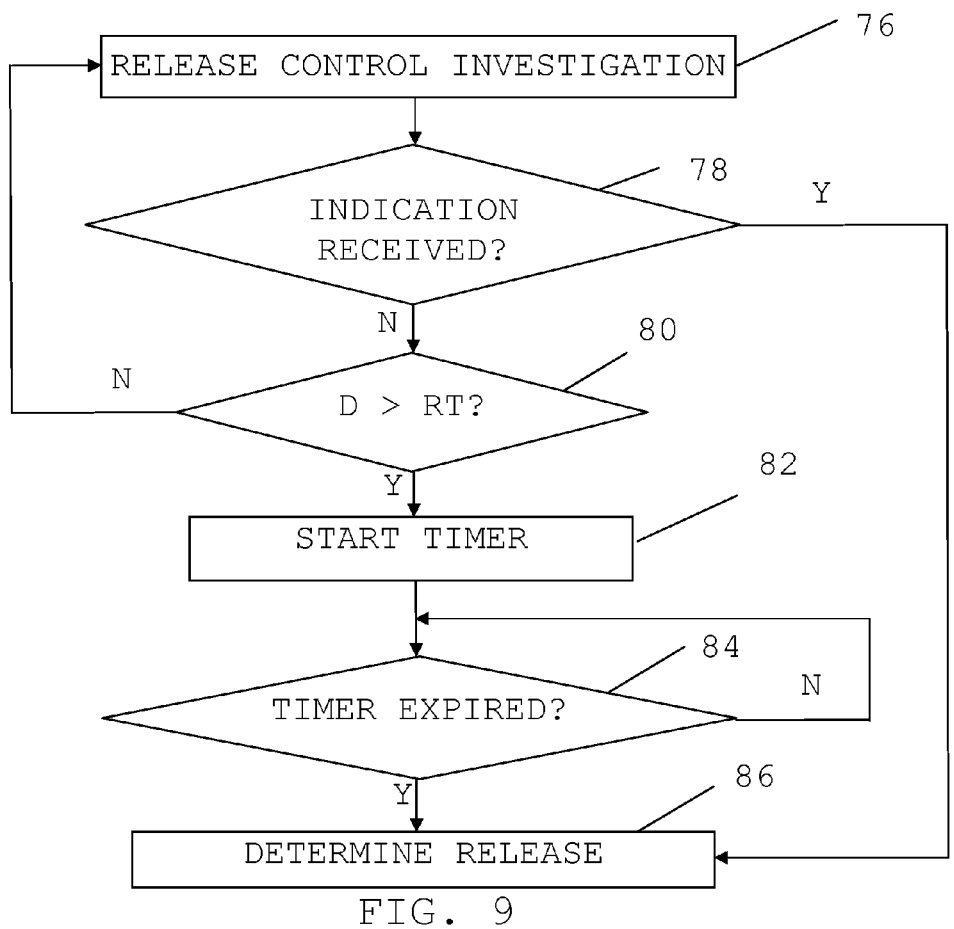
FIG. 9 shows a flow chart of a third group of method steps being performed in the method of enabling an operator of the process control system to determine the location of field users, and FIG. 10 schematically shows a data carrier with computer program code, in the form of a CD-ROM disc, for performing the steps of the method.

A first embodiment of the invention will now be described with reference also being made to FIGS. 4-9, where FIG. 4 schematically shows the first field user, which is thus a first maintenance engineer ME, and the first wireless terminal WT 32 in the first room in proximity of the first process control object M 24, FIG. 5 schematically shows a first view shown on the display of the first operator terminal of process graphics together with an indication of the first maintenance engineer, FIG. 6 schematically shows a second view shown on the display of the first operator terminal with process graphics GR, an indication of the first maintenance engineer as well as further information relating to the first maintenance engineer, FIG. 7 shows a flow chart of a first group of method steps being performed in a method of enabling an operator of the process control system to determine the location of field users, FIG. 8 shows a flow chart of a second group of method steps being performed in the method, and FIG. 9 shows a flow chart of a third group of method steps being performed in the method.

The wireless terminals available today are equipped with a lot of different sensors, such as Global Positioning System (GPS), Bluetooth, Wi-Fi and Near Field Communication (NFC). Using these sensors as well as other communication systems it would be possible to detect the position of a wireless terminal, such as the first wireless terminal 32. If the process control system 10 is also aware of the physical position of process control objects then it is possible to determine when a wireless terminal is moving close to a certain process control object, for instance because the maintenance engineer carrying the wireless terminal is to service the process control object. This can be used in order to assist a process control system operator.

The role of the process control operator, typically sitting at an operator terminal in a control room, for instance at the first operator terminal 12, is to monitor the process. It is important for the operator to see that the process is behaving normally and that possible alarms are handled fast and efficiently. This is often done viewing process graphics GR of the elements in the process, where process or object values may at the same time be observed.

Furthermore, from time to time it is possible that maintenance of objects in the process is needed. This may lead to maintenance engineers moving out to the process control objects.

In this situation the control room operator also has to be aware of safety aspects, i.e. that the maintenance engineer does not risk a harmful situation which can injure him or her. In some instances the situation could be lethal. The control room operator may thus need to watch where the maintenance engineers are while at the same time monitoring the process.

Operators working in the control rooms thus want to know the location of maintenance engineers and perhaps also the status of what these maintenance engineers are working with. Today when operators manage the plant process from the control room by monitoring process graphics, no information is given regarding the status of the other personnel at the plant.

The present invention is directed towards providing the control room operator with the ability to monitor the location of maintenance engineers together with monitoring the performance of the process without having to switch between different screens, which thus improves the safety in the system and simplifies the work of the operator.

The invention solves the above-mentioned problem through the use of a field user presenting arrangement which comprises a presentation control unit and an optional object release determining unit. In the first embodiment of the invention the arrangement is provided as the first operator terminal 12, with the presentation control element and the object release determining elements of the control unit acting as presentation control unit and object release determining unit. In another embodiment of the invention the arrangement is provided as the field user presenting server with the presentation control block and the object release determining block acting as presentation control unit and object release determining unit. When the arrangement is provided as the first operator terminal, the field user providing server may be omitted. It is also possible that one of the units is provided in the operator terminal, with the other provided in the field user presenting server. The positions of maintenance engineers may be tracked in various ways. In this first embodiment the presentation control element 36 of the operator terminal 12 keeps track of the field users and their positions in the plant 10.

The presentation control element 36 of the operator terminal 12 may obtain the positions of all wireless terminals and thereby the positions of all maintenance engineers. Thereby also the position of the first wireless terminal 32 and thus the position P1 of the first maintenance engineer ME is also obtained, step 52. This position may be obtained via the wireless network WN. The position of the wireless terminal 32 may more particularly be obtained through knowledge of which wireless access point 46, 48 and 50 it is in contact with. The signal strength of the communication between the wireless terminal and access point may be used to determine the distance between the wireless terminal and the access point, which gives a radius around the access point at which the wireless terminal may be located. This together with knowledge of the layout of the premises, such as where walls, floors and ceilings are provided, may be used for estimating the position. Furthermore, if a wireless terminal is in contact with more access points, then triangulation may be used. Here the points of intersection of the radiuses of two or three access points may be used for determining the position. Also this may be combined with knowledge of the layout of the premises in order to determine the position of the wireless terminal. The presentation control element 36 of the operator terminal 12 may also have or gain knowledge of the positions of the process control objects. The presentation control element 36 may thereby obtain the positions of the various objects in the premises such as the positions of process control objects, like the first process control object 24, step 54.

The presentation control element 36 may more particularly compare the positions of the maintenance engineers with the positions of the process control objects in order to determine how the positions of the maintenance engineers are to be presented in the process graphics GR.

This will now be exemplified in relation to the first process control object 24 and the first maintenance engineer ME.

The first maintenance engineer ME of the first wireless terminal 32 is initially in some other location of the premises than the first room.

The first maintenance engineer ME may move through the premises 45 and may then also enter the first room. The position of the first wireless terminal 32 may then be continuously reported to the presentation control element 36 of the first operator terminal 12. The presentation control element 36 then compares this position P1 with the positions of the process control objects, step 56. The presentation control element 36 may now detect that the first maintenance engineer ME with his or her first wireless terminal WT 32 moves in to the proximity of the first process control object 24, i.e. in proximity of the motor M. This may be done through detecting that the distance D between the wireless terminal 32 and the object is below a proximity threshold PT, which proximity threshold PT may be set to be a radius of a circle around the process control object. If now the distance D between the maintenance engineer and the process control object 24 is below the proximity threshold, step 58, then the maintenance engineer ME is presented on the process graphics which depicts the process, where a maintenance engineer deemed to be in the vicinity of an object is presented at this object in the graphics. In this example the maintenance engineer is presented on the image of the process control object in the process graphics, step 60. If however the distance is higher than the proximity thresholds, step 58, then the maintenance engineer position P1 is continued to be compared with process control object positions, step 56. It is possible that the positions of maintenance engineers are presented even though they are not close to an object. If being between two objects then the maintenance engineer may as an example be presented halfway between the images of the same objects in the graphics.

The provision of an indication of the field user on a process control object will now be exemplified with reference to FIGS. 3, 4 and 5. If the first wireless terminal 32 moves to within the area A, i.e. to within a radius r of the first process control object 24, then the presentation control element will present the first maintenance engineer ME on the image of the first process control object 24 via the display 42. This is in FIG. 5 shown as providing the name of the operator, Johnny, on the image of the object 24.

In this way the control room operator is able to immediately see the positions of the maintenance engineers and the process control objects they are close to in the process graphics. There is no need to look at different screens.

The operator will thereby no longer have to view process graphics only on the monitors of the operator terminals, but also maintenance engineers located close to and working on any process control object currently displayed in the process graphics.

It may here be of interest for the control room operator to look at more data about the maintenance engineer ME. As the graphics GR with the maintenance engineer ME is being displayed on the display 42 of the operator terminal 12, the operator may select, via the user input unit 40, to see more information about the maintenance engineer ME. When the presentation control element 36 receives such selection of further information from the operator concerning the maintenance engineer, it then accesses the history database 20 and accesses or obtains history data of the maintenance engineer, such as data of previous objects this engineer has serviced. Then the presentation control element 36 continues and presents at least some of the history data on the display 42. This can be seen in FIG. 6, where there is a first further field on the right of the process graphics GR and in this first further field previously serviced objects, such as a first earlier served or controlled process control object, here termed first history object HO1, is shown. If the operator for instance hovers or clicks on a presented maintenance engineer additional information will thus be shown.

It is furthermore possible that at the same time the geographical position of the maintenance engineer ME is shown. The presentation control element 36 may have access to a map MP and may at the same time or based on separate operator inputs via the user input unit 40 present the position P1 of the maintenance engineer ME on this map MP in a further field of the display 42. The presentation control element 36 may thus present the position P1 of the maintenance engineer ME on a map MP as a response to a selection of further information made by the operator. This can also be seen in FIG. 6, where there is a second further field on the right of the process graphics GR and above the first further field with history objects.

It should be realized that it is also possible to show more maintenance engineers in the graphics GR. In this case it is possible to selectively get further information about all these maintenance engineers.

It is possible for the maintenance engineers to seize control of the objects. If they do this, then the objects will in the process control system be indicated as controlled by a maintenance engineer. When an object is controlled by a maintenance engineer, it may be placed in a safety state.

A maintenance engineer may take control in a number of ways. One way is to manually enter, via the own wireless terminal, an instruction that is forwarded to the control system that a specific object is being seized. However, control may also be seized automatically. The wireless terminal may be equipped with short range communication ability, such as near field communication (NFC), bar code reading or Bluetooth. This short range communication ability may be used to automatically obtain an identifier of a process control object if the wireless terminal is held with a short range communication unit facing this process control object. Once such an identifier has been obtained it may be automatically sent by the wireless terminal to the process control system. When this object identifier is transferred, it may be accompanied by an identifier identifying the maintenance engineer, such as an identifier of the wireless terminal. Once the process control object identifier and the maintenance engineer identifier are received in the system, typically by the server 18, then the corresponding process control system object is placed under the control of the maintenance engineer.

That a maintenance engineer has seized control of an object may also be presented on the process graphics GR. This is handled by the object release determining unit, which in the first embodiment is the object release determining element 38 of the first operator terminal 12.

The object release determining element 38 therefore investigates the maintenance engineer status, step 62, which may be done through investigating at the server 18 if any process control object is under the control of a maintenance engineer, such as the first maintenance engineer ME. If the first maintenance engineer ME is not in control of any object, step 64, then the status is continued to be investigated, step 62. However, if the first maintenance engineer ME is found to be in control of an object, step 64, through receiving an indication that the field user is in control of the object, then the object release determining element 38 instructs the presentation control element 36 to present the control. The presentation control element 36 then presents the control in the process graphics GR, step 66. It thus indicates the control in the presenting of the maintenance engineer on the process graphics. If the first maintenance engineer ME in FIG. 4 seized control of the first process control object 24, then this control CT could be displayed by the presentation control element 36 on the display 42 through the image of the first process control object being encircled or enclosed in a box. The process graphics will thus automatically indicate if maintenance engineers take manual control of objects.

After the maintenance engineer has been found to control a process control object, the object release determining element 38 continues and investigates the maintenance engineer status, step 68. However, this time the investigation concerns whether the maintenance engineer has released control of a seized object or not.

If the maintenance engineer has not released control, step 70, then the investigation continues, step 68. However, if the first maintenance engineer ME is found to have released control, step 70, then the object release determining element 38 instructs the presentation control element 36 to present the fact that control has been released. The presentation control element 36 then presents the change status of the object, i.e. that control has been released, step 72. The presentation control element 36 may do this to remove the presentation of the control CT in the process graphics GR. This could in the example of FIG. 5 be done through removing the box around the image of the first process control object 24.

It is in relation to control of objects possible that the system is put in a special state. This state, which may be termed a first state, could be applicable to the whole system or in some cases only to a part of the system where the seized process control object is provided. The first state could thus concern at least in a section of the system in which said object being controlled by the field user is provided. This state may for instance be a safety state where the process is shut down completely or partly or running in a safety mode. It is possible that the control room operator puts the system in such a state prior to the first maintenance engineer ME entering the first room, perhaps prior to the first maintenance engineer ME entering the premises 45. It is also possible that such a safety state is entered automatically when the first maintenance engineer seizes control of an object.

According to this first embodiment the object release determining element 36 instructs the process control system to change system state when detecting that the control has been released, for instance through informing the server 18. The server may then change system state to a second state, step 74. It is thus possible for the system to change from the first to the second state based on a determination of the release of the object.

It is here possible that the position of the maintenance engineer and/or that the time after object release is considered before system state is changed. The system state change may for instance not be made until the first maintenance engineer has left the first room or the building or after a safety time has elapsed.

The change of system state may be a change to full operation. However it may also be a change to a second safety state, which is less severe than a first safety state.

The release of the object may be actively made by the maintenance engineer. However, it is possible that he or she may also forget this. In this case there may be a need for a mechanism to handle the release of objects so that normal system operation may be resumed.

Therefore the object release determining element 38 investigates the release of the control of a process control object, step 76. This may more particularly be done through the object release determining element 38 investigating if the maintenance engineer ME has sent an indication to the system via his or her wireless terminal.

If such an indication has been received, for instance by the server 18, step 78, then the object release determining element 38 determines that the object has been released, step 86. However, if no such indication is received, the object release determining element 38 investigates the position of the maintenance engineer in relation to the controlled process control object. It does this through investigating if the distance D between the maintenance engineer ME and process control object is above a release threshold RT. It thus compares the distance between the maintenance engineer ME and process control object. As the comparison happens when the object is believed to be seized it is clear that it is made after the object release determining element 38 has received an indication of the maintenance engineer having taken control of the object. The threshold may be the same as the previously mentioned proximity threshold PT, but is normally not. It is typically a higher threshold. In the example of FIG. 3, it may correspond to the maintenance engineer being outside of the first room.

If the distance D is below this threshold RT, step 80, then object release determining element returns to the beginning of the investigation, step 76. However, if the distance is above or exceeds this threshold, step 80, then the object release determining element 38 starts a release timer, step 82. As the timer is started when the object is still deemed to be seized, it is clear that the starting is made after the object release determining element 38 has received an indication of the maintenance engineer having taken control of the object. It is here possible that the distance D is continuously compared with the release threshold as the timer is in operation and that if the distance goes below the release threshold then the timer may be reset. The release timer may thus be reset each time the distance between the controlled object and the maintenance engineer falls below the release threshold.

As the timer is running, the object release determining element 38 continuously investigates if the timer has expired, i.e. if the timer has a value that exceeds or is equal to a timer threshold value. If it has, step 84, then the object release determining element 38 determines that the maintenance engineer has released the object, step 86. The determining that the field user has released the object is thus also based on the release threshold being exceeded. It may here also be mentioned that it is possible to only use position for determining release or only time. This time may then be counted from when the object was seized.

It can thus be seen that a process control system is provided where field users and information of their current status is integrated into the plant control system. Information is automatically updated and visible to others. The position of the field users is automatically displayed in the process graphics. Operators in the control room can also select available maintenance engineers from a list and view their location on a real map.

Information about what the maintenance engineers with wireless terminals are working with will also be included, when maintenance engineers are working with specific objects (i.e. has manual control of any object, etc.). This information will be visible to the operator. These features will make it easy to get a good overview of what is going on in the plant.

The invention has a number of further advantages.

The possibility to view the current location of each person (on both a regular map as well as in the process graphics) combined with the possibility to view which objects they are working on, will give operators an unprecedented overview of the plant and its current status. The process graphics would thereby indicate by whom and to which process control objects maintenance work is being performed.

As operators are better informed about what is going on in the plant and the location of field workers, safety will be improved.

Operators are always updated with the current situation about both the process and the staff working with the process, which improves the contextual awareness of the operators.

The operators will quickly know who are available for task assignments, which improves efficiency.

Figure 10:
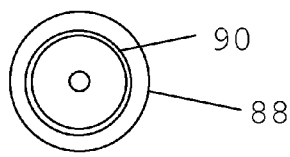

The presentation control unit and the optional object release determining unit may, as was mentioned above, be provided in the form of one or more processors together with computer program memory including computer program code for performing their functions. This computer program code may also be provided on one or more data carriers which perform the functionality of the present invention when the program code thereon is being loaded into one or more devices implementing the field user presenting arrangement. One such data carrier 88 with computer program code 90, in the form of a CD ROM disc, is schematically shown in FIG. 10.

The invention can be varied in many more ways than the ones already mentioned. It should therefore be realized that the present invention is only to be limited by the following claims.

The invention claimed is:

1. A method of enabling an operator of a process control system to determine the location of field users in the process control system, the method being performed by a field user presenting arrangement and comprising the steps of:
    obtaining position data of the position of a field user in the form of a maintenance engineer;
    obtaining the positions of objects in the process control system;
    comparing the position of the maintenance engineer with the positions of the objects;
    determining that the maintenance engineer is in the vicinity of an object if the distance between the position of the maintenance engineer and the position of the object is below a proximity threshold;
    presenting the maintenance engineer on graphics depicting the process, where a maintenance engineer deemed to be in the vicinity of an object is presented at this object in the graphics;
    receiving an indication that the maintenance engineer is in control of the object, wherein the process control system is in a first state at least in a section of the system in which said object being controlled by the maintenance engineer is provided, said first state being a safety state where the process is shut down completely or partly or running in a safety mode;
    indicating this control in the presenting of the maintenance engineer on the graphics;
    comparing, after the indication of control has been received, the distance between the controlled object and the maintenance engineer with a release threshold;
    determining that the maintenance engineer has released the object based on the threshold being exceeded;
    presenting the changed status of the object; and
    instructing the process control system to change system state based on the determination of the release of the object.

2. The method according to claim 1, further comprising the steps of receiving a selection of further information concerning the maintenance engineer and accessing history data of the maintenance engineer and presenting at least some of said history data.

3. The method according to claim 2, wherein the history data comprises data about earlier objects controlled by the maintenance engineer.

4. The method according to claim 3, further comprising the step of presenting, as a response to the selection of further information, the position of the maintenance engineer on a map.

5. The method according to claim 3, further comprising the steps of starting a release timer after the indication of control has been received and determining that the maintenance engineer has released the object if the timer has expired.

6. The method according to claim 2, further comprising the step of presenting, as a response to the selection of further information, the position of the maintenance engineer on a map.

7. The method according to claim 2, further comprising the steps of starting a release timer after the indication of control has been received and determining that the maintenance engineer has released the object if the timer has expired.

8. The method according to claim 1, further comprising the steps of starting a release timer after the indication of control has been received and determining that the maintenance engineer has released the object if the timer has expired.

9. The method according to claim 8, wherein the release timer is started by the release threshold being exceeded.

10. The method according to claim 9, wherein the release timer is reset each time the distance between the controlled object and the maintenance engineer falls below the release threshold.

11. The method according to claim 1, further comprising the steps of receiving an indication that the maintenance engineer has released the object, determining that the object has been released based on the indication and presenting the changed status of the object.

12. A field user presenting arrangement for enabling an operator of a process control system to determine the location of field users in the process control system, the field user presenting arrangement comprising:
    a presentation control unit configured to:
        obtain position data of the position of a field user in the form of a maintenance engineer;
        obtain the positions of objects in the process control system;
        compare the position of the maintenance engineer with the positions of the objects;
        determine that the maintenance engineer is in the vicinity of an object if the distance between the position of the maintenance engineer and the position of the object is below a proximity threshold; and
        present the maintenance engineer on graphics depicting the process, where a maintenance engineer deemed to be in the vicinity of an object is presented at this object in the graphics; and
    an object release determining unit configured to:
        receive an indication that the maintenance engineer is in control of the object, wherein the process control system is in a first state at least in a section of the system in which said object being controlled by the maintenance engineer is provided, said first state being a safety state where the process is shut down completely or partly or running in a safety mode;

instruct the presentation control unit to indicate this control in the presenting of the maintenance engineer on the graphics;

compare, after the indication of control has been received, the distance between the controlled object and the maintenance engineer with a release threshold;

determine that the maintenance engineer has released the object based on the threshold being exceeded;

instruct the presentation control unit to present the changed status of the object; and instruct the process control system to change system state based on the determination of the release of the object.

13. The field user presenting arrangement according to claim 12, wherein the presentation control unit is further configured to receive a selection of further information concerning the maintenance engineer, access a history database with history data of the maintenance engineer and present at least some of said history data.

14. The field user presenting arrangement according to claim 13, wherein the history data comprises data about earlier objects controlled by the maintenance engineer.

15. The field user presenting arrangement according to claim 13, wherein the presentation control unit is further configured to present, as a response to the selection of further information, the position of the maintenance engineer on a map.

16. The field user presenting arrangement according to claim 12, wherein the object release determining unit is configured to start a release timer after the indication of control has been received and determine that the maintenance engineer has released the object if the timer has expired.

17. The field user presenting arrangement according to claim 16, wherein the object release determining unit is configured to start the release timer when the release threshold is exceeded.

18. The field user presenting arrangement according to claim 17, wherein the object release determining unit is configured to reset the release time each time the distance between the controlled object and the maintenance engineer falls below the release threshold.

19. The field user presenting arrangement according to claim 12, wherein the object release determining unit is further configured to receive an indication that the maintenance engineer has released the object, determine that the object has been released based on the indication and order the presentation control unit to present the changed status of the object.

20. A computer program product for enabling an operator of a process control system to determine the location of field users in the process control system, said computer program product being provided on a non-transitory data carrier comprising computer program code configured to cause a field user presenting arrangement to, when said computer program code is loaded into the field user presenting arrangement:

obtain position data of the position of a field user in the form of a maintenance engineer;

obtain the positions of objects in the process control system;

compare the position of the maintenance engineer with the positions of the objects;

determine that the maintenance engineer is in the vicinity of an object if the distance between the position of the maintenance engineer and the position of the object is below a proximity threshold;

present the maintenance engineer on graphics depicting the process, where a maintenance engineer deemed to be in the vicinity of an object is presented at this object in the graphics;

receive an indication that the maintenance engineer is in control of the object, wherein the process control system is in a first state at least in a section of the system in which said object being controlled by the maintenance engineer is provided, said first state being a safety state where the process is shut down completely or partly or running in a safety mode;

indicate this control in the presenting of the maintenance engineer on the graphics;

compare, after the indication of control has been received, the distance between the controlled object and the maintenance engineer with a release threshold;

determine that the maintenance engineer has released the object based on the threshold being exceeded;

present the changed status of the object; and instruct the process control system to change system state based on the determination of the release of the object.

* * * * *